US009511320B2

(12) United States Patent
Kim et al.

(10) Patent No.: US 9,511,320 B2
(45) Date of Patent: Dec. 6, 2016

(54) POLYIMIDE-BASED MACROMOLECULAR COMPOUND AND GAS-SEPARATION ASYMMETRICAL HOLLOW-FIBRE MEMBRANE COMPRISING THE SAME

(71) Applicant: KOREA RESEARCH INSTITUTE OF CHEMICAL TECHNOLOGY, Daejeon (KR)

(72) Inventors: Jeong Hoon Kim, Daejeon (KR); Hee Moon Park, Daejeon (KR); Bong Jun Chang, Daejeon (KR); Mihye Yi, Daejeon (KR); Eun-Hee Kim, Busan (KR); Chae Young Park, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 14/687,353

(22) Filed: Apr. 15, 2015

(65) Prior Publication Data

US 2015/0217225 A1 Aug. 6, 2015

Related U.S. Application Data

(63) Continuation of application No. PCT/KR2013/009203, filed on Oct. 15, 2013.

(30) Foreign Application Priority Data

Oct. 15, 2012 (KR) .................... 10-2012-0114029
Oct. 15, 2013 (KR) .................... 10-2013-0122425

(51) Int. Cl.
*B01D 53/22* (2006.01)
*B01D 69/08* (2006.01)
(Continued)

(52) U.S. Cl.
CPC ......... *B01D 53/228* (2013.01); *B01D 67/0016* (2013.01); *B01D 69/02* (2013.01);
(Continued)

(58) Field of Classification Search
CPC ............ B01D 53/228; B01D 67/0016; B01D 69/0002; B01D 69/087; B01D 69/088; B01D 69/12; B01D 71/64; B01D 2256/245; B01D 2257/504; B01D 69/02; B29C 47/0026; B29C 47/56
See application file for complete search history.

(56) References Cited

U.S. PATENT DOCUMENTS 3,073,785 A * 1/1963 Angelo ............. C08G 73/1028
252/513
4,478,209 A * 10/1984 Guarnieri ................ C08J 7/047
126/569
(Continued)

FOREIGN PATENT DOCUMENTS

KR 1020100025989 A 3/2010
WO WO 2013/015336 A1 * 1/2013 ............. B01D 74/64

OTHER PUBLICATIONS

Kil-Yeong Choi, et al; "Synthesis and Characterization of Novel Polyimides from Alicyclic Dianhydride", Korea Polymer Journal, vol. 4, No. 2, pp. 117-124; 1996.
Andreea Irina Cosutchi, et al; Effects of the Aliphatic/Aromatic Structure on the Miscibility, Thermal, Optical, and Rheological Properties of Some Polyimide Blends; Article first published online Feb. 17, 2012; Polymer Engineering & Science, vol. 52, Issue 7, pp. 1429-1439.
(Continued)

*Primary Examiner* — Jason M Greene
(74) *Attorney, Agent, or Firm* — Ladas & Parry LLP

(57) ABSTRACT

The present invention relates to a polyimide-based macromolecular compound which is produced by using DOCDA and one or more diamines selected from the group consisting of MDA, ODA, PDA, TDA, TrMPD, TeMPD and MBCA; and a gas-separation asymmetrical hollow-fiber membrane comprising the same. The polyimide-based macromolecular compound according to the present invention can advantageously be used in the production of a gas-separation hollow-fiber membrane having an asymmetrical structure since the said compound is highly viscous due to a high molecular weight in addition to having outstanding gas permeability and high selectivity while having excellent high heat resistance, chemical resistance, and mechanical properties and being outstandingly soluble in polar organic solvents.

5 Claims, 3 Drawing Sheets

(51) Int. Cl.
  *B01D 71/64*     (2006.01)
  *B29C 47/00*     (2006.01)
  *B01D 67/00*     (2006.01)
  *B01D 69/02*     (2006.01)
  *B29C 47/36*     (2006.01)
  *B29C 47/68*     (2006.01)
  *B29K 79/00*     (2006.01)
  *B29L 23/00*     (2006.01)
  *B29C 47/56*     (2006.01)

(52) U.S. Cl.
  CPC .......... *B01D 69/087* (2013.01); *B01D 71/64* (2013.01); *B29C 47/0014* (2013.01); *B29C 47/0021* (2013.01); *B29C 47/364* (2013.01); *B29C 47/68* (2013.01); *B01D 2053/224* (2013.01); *B01D 2256/245* (2013.01); *B01D 2257/504* (2013.01); *B01D 2325/023* (2013.01); *B29C 47/56* (2013.01); *B29K 2079/085* (2013.01); *B29L 2023/001* (2013.01); *Y02C 10/10* (2013.01); *Y02P 70/26* (2015.11)

(56) References Cited

U.S. PATENT DOCUMENTS

| 2009/0286078 | A1* | 11/2009 | Lee ........................ | B01D 53/22 |
| | | | | 428/364 |
| 2012/0111051 | A1* | 5/2012 | Kulkarni .............. | B01D 53/229 |
| | | | | 62/619 |
| 2014/0130667 | A1* | 5/2014 | Sano ................... | B01D 53/228 |
| | | | | 95/51 |
| 2015/0053079 | A1* | 2/2015 | Koros ................. | B01D 53/228 |
| | | | | 95/50 |

OTHER PUBLICATIONS

Ye Liu, et al; "Chemical Cross-linking Modification of Polyimide1Poly(ether sulfone) Dual-Layer Hollow-Fiber Membranes for Gas Separation", Ind. Eng. Chem. Res. vol. 42, pp. 1190-1195, Published on Web Feb. 19, 2003.

International Search Report mailed Dec. 2, 2013. PCT/KR2013/009203.

\* cited by examiner

US 9,511,320 B2

POLYIMIDE-BASED MACROMOLECULAR COMPOUND AND GAS-SEPARATION ASYMMETRICAL HOLLOW-FIBRE MEMBRANE COMPRISING THE SAME

CROSS REFERENCE TO RELATED APPLICATIONS

This application is a continuation application and claims the benefit of PCT Application No. PCT/KR2013/009203 having an international filing date of Oct. 15, 2013 which also claims the benefit of Korean Application No. 10-20013-0122425 filed on Oct. 15, 2013 and claims the benefit of Korean Application No. 10-2012-0114029 filed on Oct. 15, 2012 in which each are all incorporated herein by reference in their entirety.

BACKGROUND OF THE INVENTION

1. Field of the Invention

The present invention relates to a polyimide-based macromolecular compound which is produced by using DOCDA and one or more diamines selected from the group consisting of MDA, ODA, PDA, TDA, TrMPD, TeMPD and MBCA; and a gas-separation asymmetrical hollow-fibre membrane comprising the same. More particularly, the present invention relates to a polyimide-based macromolecular compound which is advantageously used for the production of a hollow-fibre membrane having the asymmetrical structure since the compound not only has excellent gas permeability and high selectivity but also has high heat resistance, high chemical resistance, and excellent mechanical properties, along with outstanding solubility in polar organic solvents and high molecular weight which is appropriate for dry jet-wet spinning.

2. Description of the Related Art

The conventional process for gas-separation widely used in the industrial field is exemplified by the energy-guzzling distillation, extraction, evaporation, absorption, adsorption, cryogenics, and crystallization. Such separation process uses approximately 40% of total energy consumed in the industrial site. Studies and many attempts have been made for establishing a separation process that can replace the conventional energy consuming process. And as a result, a membrane separation process using a membrane for separation is rising as an alternative.

The membrane separation process using a separation membrane is known not to accompany phase change in the course of separation, suggesting that it consumes less energy, is pro-environmental, and does not require a huge facility owing to the simple process with simple equipments. That is, the operation, maintenance, and management, of the method is easy and advantageous. Further the above method allows the scale-up easily and can also be operated in hybrid system with other separation processes.

In the history of study about such a separation membrane, the full-scale experiment on a gas-separation membrane has started in 1960s, and a preparation method of an asymmetrical reverse osmosis membrane established by Loeb and Sourirajan has been applied to gas-separation in 1970s, since then the studies on the separation membrane have advanced rapidly.

In the early 1977, Monsanto Co. first attempted to apply a hollow-fibre membrane to the process of hydrogen separation and collection that is generated in the course of purification, which was quite successful. Based on the successful attempt, the company began to sale the membrane in the brand name of PRISM in 1979. So, the company Monsanto now sales 75 membrane separation systems world-widely.

In addition to the PRISM provided by Monsanto, a spiral wound CA module provided by Separex has been successfully applied to the processes of recovering $H_2$ from the waste gas generated in the course of refinery process and petrochemical process and regulating $H_2$ composition at ammonia plant and also applied to the process running at methanol plant.

An attempt has been made to apply the separation membrane further to the separation of $CO_2$ in addition to the separation of $H_2$. In particular, natural gas collected from oil field is generally composed of 40~45 mol % $CO_2$ and 54~59 mol % $CH_4$. The membrane separation process was successfully introduced for the separation of $CO_2/CH_4$.

Studies followed, and as a result the process of purifying $CH_4$ from bio-gas or natural gas by eliminating $CO_2$ has been commercialized, which triggered the foundation of many companies. The method keeps advancing to broaden its application and now can compete with the conventional methods such as cryogenics, absorption, and adsorption well enough to replace them.

Considering economics of the gas separation process using a membrane, the selectivity of membrane material influences the recovery rate, and the permeability decides the cost, of membrane module and plant. So, even after the commercialization of gas-separation membrane, additional studies are under-going to develop a separation membrane that has high permeability and selectivity and is applicable under harsh condition such as high temperature and high pressure.

The material used for the production of a membrane for gas separation is mostly a nonporous macromolecular membrane. To use the separation membrane made of a macromolecular material in the industry, the membrane needs to have high gas permeability and selectivity and at the same time has to have excellent thermo-stability and mechanical stability so as to endure high pressure and high temperature when it turns into a thin membrane. In addition, the membrane has to have chemical stability against gas toxicity. In the case of mass-production of such a membrane in the form of a hollow-fibre membrane, the solubility in organic solvents applicable for phase inversion process and high molecular weight for high viscosity appropriate for spinning are required.

At least 1,000 materials have been studied, and tried so far for the separation membrane. However, only 8~9 materials have been successfully commercialized considering the price, the productivity, and the properties of the material. The commercialized gas separation membrane materials so far are exemplified by polysulfone, polyimide, cellulose acetate, polycarbonate, and polypyrrolidone. Polysulfone is commercialized by Air Products, Co., USA, and the brominated polycarbonate is commercialized by MGI. Polyimide is commercialized by Ube, Japan, and cellulose acetate is commercialized by Dow.

Among them, polyimide is characterized by high chemical stability and the thermo-stability, compared with such materials as polysulfone, cellulose acetate and polycarbonate. Besides, polyimide has polarity and high capability of gas separation particularly carbon dioxide/methane, oxygen/nitrogen, hydrogen/nitrogen, and carbon dioxide/nitrogen, owing to the stiff molecular chain thereof. Because of such properties of polyimide, it has been a promising target of many researches to develop a separation membrane. For example, Ube Co., Japan commercialized a gas separation hollow-fibre membrane using the self-developed biphenyl aromatic polyimide Upilex-R (BPDA-ODA) copolymer. Evonic Co., Germany, was also succeeded in the commercialization of a hollow-fibre membrane for methane separation using the aromatic polyimide copolymer P84. Air Liguide Co., USA, developed and commercialized a gas separation hollow-fiber membrane with the soluble polyimide Matrimide using the alicycle dianhydride produced by Hunsmann Co., USA, and now not only sells it in the market but also extends its market further by applying thereof to the fields of bio-methane and natural gas. Such companies developed their own separation membranes using the self-developed polyimide material and supplied them to the world-market exclusively.

The applicable range of such separation membrane has been rapidly widened because of world-wide oil depletion, which includes the purification of natural gas, the purification of bio-methane generated from organic waste, the membrane separation for recovering $CO_2$ from combustion flue gas, and the processes required in the field of petrochemistry using a membrane for the separation of $H_2/CO_2$ and $N_2/O_2$ in the combined cycle power plant or oxy-fuel combustion process. The market of a separation membrane is also growing to the field of separation of $H_2$ in the course of synthetic gas production. To develop a highly competitive separation membrane in the field of purification of methane/$CO_2$, $O_2/N_2$, and $H_2/CO_2$, a novel polyimide material usable for the preparation of a hollow-fibre membrane that has high solubility in organic solvents and high molecular weight is urgently required.

U.S. Pat. No. 4,851,505 and U.S. Pat. No. 4,912,197 describe the polyimide gas-separation membrane characterized by high selectivity, productivity, and mechanical stability using the annealed polyimide polymer having a specific repeat unit in the course of the process and excellent solubility in general solvents, which is therefore advantageous in reducing complexity in the polymer processing.

US Patent Publication no. 2009-0227744 describes the membrane displaying high selectivity, productivity, and mechanical stability by using the annealed polyimide polymer having a specific repeat unit.

Therefore, the present inventors prepared a DOCDA polyimide macromolecular compound with changing diamine using DOCDA (5-(2,5-dioxotetrahydrofuryl)-3-methyl-3-cyclohexene-1,2-dicarboxylic anhydride) known as one of polyimide materials for gas-separation that has excellent solubility in organic solvents owing to its alicyclic ring structure which is advantageous for making torsion or asymmetry in the main chain as a monomer. Based on that, the present inventors further studied and established an asymmetrical gas-separation hollow-fibre membrane by dry jet-wet spinning, and confirmed that the prepared membrane had excellent gas-separation characteristics, leading to the completion of this invention.

SUMMARY OF THE INVENTION

It is an object of the present invention to provide a polyimide based macromolecular compound usable for the preparation of a gas-separation asymmetrical hollow-fibre membrane.

It is another object of the present invention to provide a method for preparing the said polyimide-based macromolecular compound.

It is also an object of the present invention to provide a gas-separation asymmetrical hollow-fibre membrane containing the said polyimide-based macromolecular compound.

It is further an object of the present invention to provide a method for preparing the gas separation asymmetrical hollow-fibre membrane.

It is also an object of the present invention to provide a method for the separation of mixed gas using the said gas-separation asymmetrical hollow-fibre membrane.

To achieve the above objects, the present invention provides the polyimide-based macromolecular compound represented by formula 1:

[Formula 1]

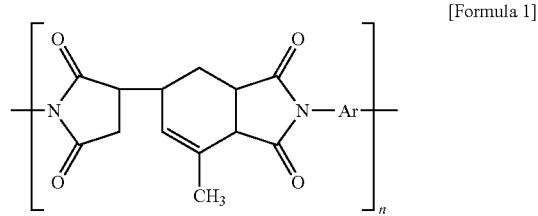

(In the formula 1,
Ar is selected from the group consisting of

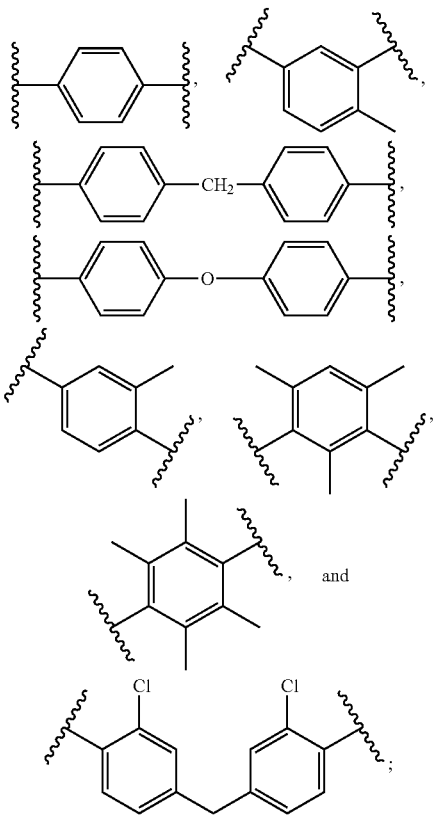

and
n is an integer of 50~150).

The present invention also provides a method for preparing the polyimide-based macromolecular compound containing the step of inducing polycondensation of the monomer compound of formula 2 and one or more monomer compounds selected from the group consisting of the compounds represented by formula 3~formula 10 in the presence of metacresol at the temperature range of 150~203° C.:

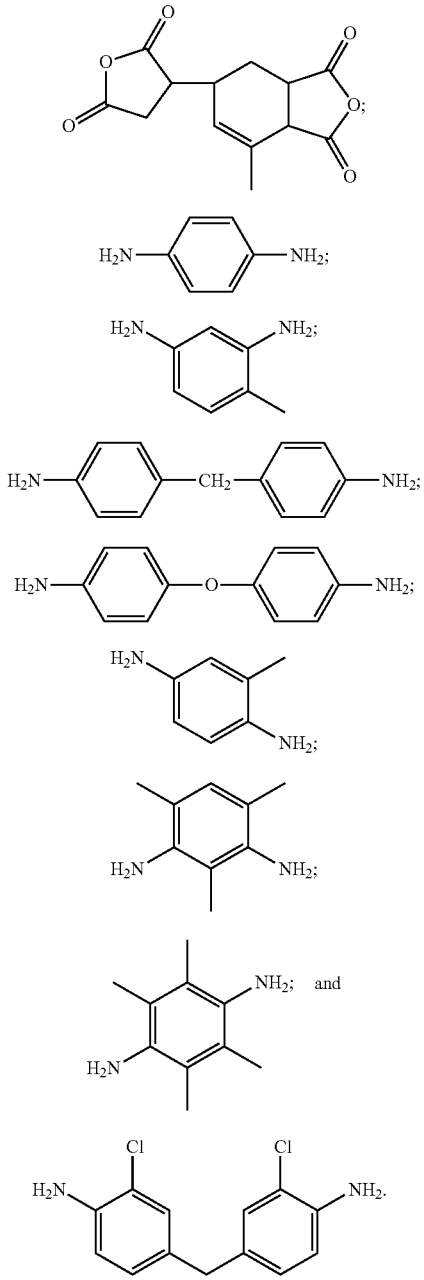

[Formula 2]

[Formula 3]

[Formula 4]

[Formula 5]

[Formula 6]

[Formula 7]

[Formula 8]

[Formula 9]

[Formula 10]

In addition, the present invention provides a gas-separation asymmetrical hollow-fibre membrane comprising the polyimide-based macromolecular compound.

The present invention further provides a method for preparing the gas-separation asymmetrical hollow-fibre membrane containing the following steps:

preparing a spinning solution composed of the said polyimide-based macromolecular compound, a non-polar organic solvent having a high boiling point, a non-solvent having a low boiling point, and a foaming agent that is another non-solvent having a high boiling point (step 1); and;

spinning the spinning solution prepared in step 1) by using a dry jet-wet spinning device equipped with a duplex tube type nozzle in the presence of an internal coagulant (step 2).

In addition, the present invention provides a method for the separation of mixed gas containing the step of separating the mixed gas by using the gas-separation asymmetrical hollow-fibre membrane.

ADVANTAGEOUS EFFECT

The polyimide macromolecular compound of the present invention not only has excellent gas permeability and high selectivity and at the same time high thermo-resistance and high chemical resistance and excellent mechanical properties but also has excellent solubility in polar organic solvents and high viscosity owing to its high molecular weight, so that it can be efficiently used for the preparation of a gas-separation a symmetrical hollow-fibre membrane.

BRIEF DESCRIPTION OF THE DRAWINGS

The application of the preferred embodiments of the present invention is best understood with reference to the accompanying drawings, wherein.

DESCRIPTION OF THE PREFERRED EMBODIMENTS

Figure 1:
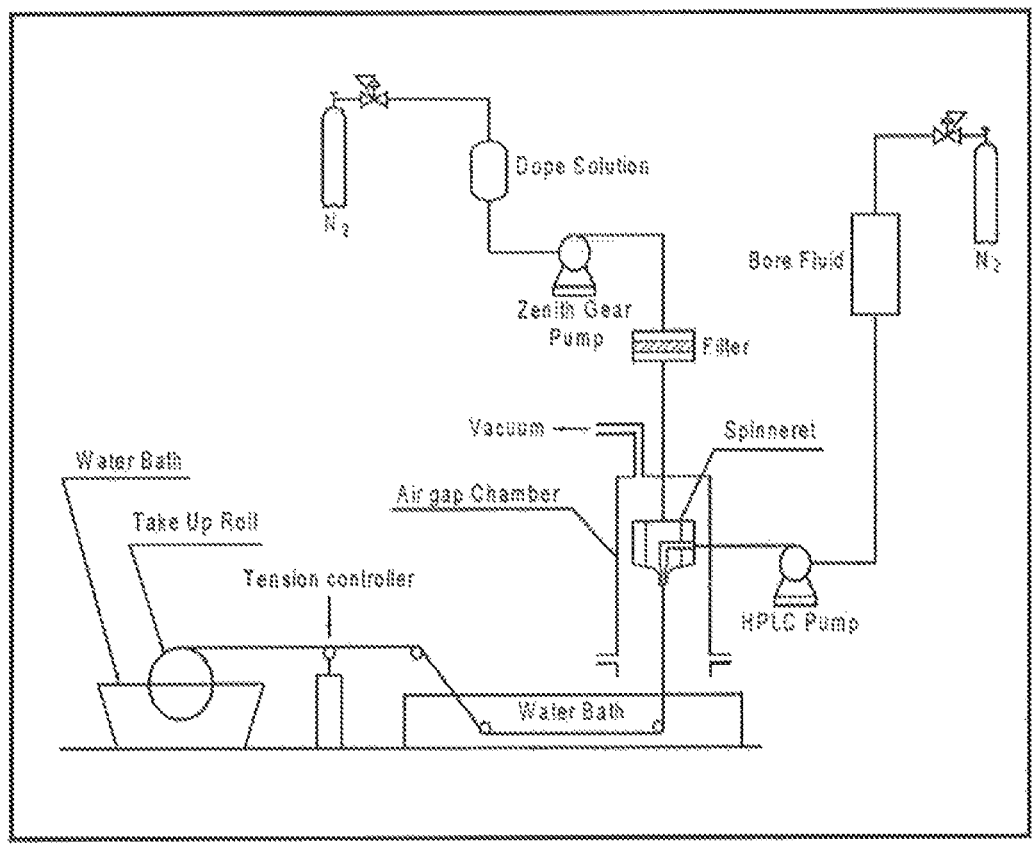
FIG. 1 is a diagram illustrating the device for the preparation of the hollow-fibre membrane of the present invention.

In this description, the term "polyimide-based macromolecular compound" indicates a monomer that is precisely a polyimide-based polymer prepared by the condensation of dianhydride (1 equivalent) and diamine (1 equivalent). More particularly, the "polyimide-based macromolecular compound" indicates the polyimide-based polymer produced by the reaction between 1 equivalent of the dianhydride DOCDA (5-(2,5-dioxotetrahydrofuryl)-3-methyl-3-cyclohexene-1,2-dicarboxylic anhydride) and 1 equivalent of one or more diamines selected from the group consisting of MDA (4,4'-Methylene dianiline), ODA (4,4'-Oxy dianiline), p-PDA (para-phenylenediamine), m-TDA (meta-toluenediamine), p-TDA (para-toluenediamine), TrMPD (2,4,6-Trimethyl-1,3-phenylenediamine), TeMPD (2,3,5,6-Tetramethyl-1,4-phenylenediamine), and MBCA (4,4'-Methylenebis(2-chloroaniline)). At this time, the homopolymer generated when a mono-diamine is used for the polymerization; and the copolymer generated when two or more different diamines are used for the polymerization are all included.

Hereinafter, the present invention is described in detail.

The present invention provides the polyimide-based macromolecular compound represented by formula 1:

[Formula 1]

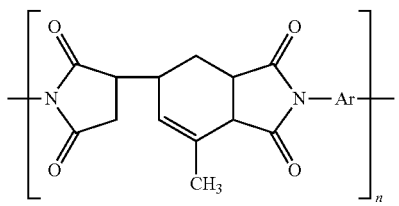

(In the formula 1,
Ar is selected from the group consisting of

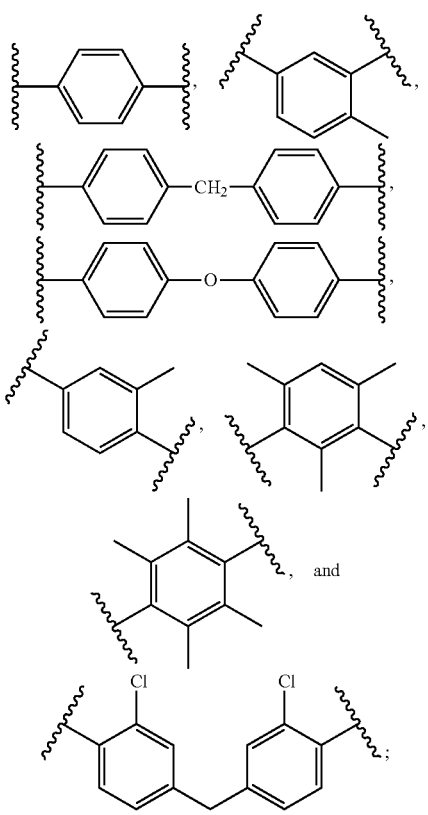

and n is an integer of 50~150).

The polyimide-based macromolecular compound of the present invention has excellent gas permeability and high gas separation selectivity, so that it can be efficiently used for the separation of methane from mixed gas, particularly from bio-gas mixture. The polyimide-based macromolecular compound of the present invention also has excellent chemical resistance and mechanical properties, in addition to excellent solubility in polar organic solvents and remarkable macromolecular weight, so that it is advantageous for the production of an asymmetrical hollow-fibre membrane having high selective permeability used for commercial purpose.

In the Experimental Example 3 of the present invention, the intrinsic viscosity of the polyimide-based macromolecular compound of the invention was measured. As a result, the DOCDA-MDA compound had the intrinsic viscosity of 1.11 dL/g; the DOCDA-ODA compound had the intrinsic viscosity of 0.45 dL/g; and the DOCDA-p-PDA compound had the intrinsic viscosity of 0.34 dL/g, which were similar to those of the conventional gas separation membrane polymers such as polysulfone, Matrimid® (a thermoplastic polyimide trademarked by CIBA Specialty Chemicals based in Basel, Switzerland), polyether sulfone, and polyimide (for example, P84® which is trademarked by Lenzing AG based in Lenzing, Austria), suggesting that the compounds of the invention had high viscosity appropriate for spinning for the preparation of a hollow-fibre membrane.

Referring to the Experimental Example 4 of the invention, the polyimide-based macromolecular compound of the invention displayed excellent solubility in many different organic solvents, indicating that it can be easily applied for the phase inversion process in the course of the preparation of a hollow-fibre membrane.

As shown in Table 3 according to the Experimental Example 5 of the invention, the gas separation membrane comprising the polyimide-based macromolecular compound of the invention was confirmed to have higher selectivity than the other gas separation membranes made of such polyimide-based polymers as DOCDA-IPDA, DOCDA-BAPB, DOCDA-APPP, DOCDA-BAPBP, DOCDA-3BAPB, and DOCDA-BAPP, so that the polyimide-based macromolecular compound of the present invention is more efficient as the macromolecular material for the gas separation membrane.

As shown in Table 3 and Table 4 according to the Experimental Example 5 of the invention, the DOCDA-ODA gas separation membrane was most excellent in the pure gas permeability and selectivity. Therefore, the polyimide-based macromolecular compound of the present invention is more preferably the compound represented by formula 11.

[Formula 11]

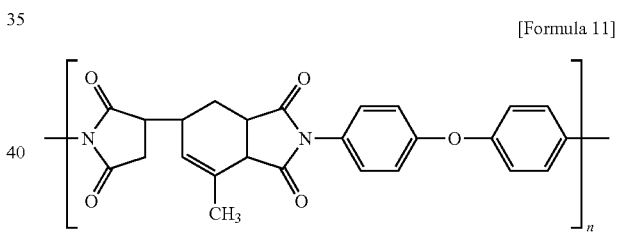

(In the formula 11, n is an integer of 50~150)

The present invention also provides a method for preparing the polyimide-based macromolecular compound containing the step of inducing poly condensation of the monomer compound of formula 2 and one or more monomer compounds selected from the group consisting of the compounds represented by formula 3~formula 10 in the presence of metacresol at the temperature range of 150~203° C.:

[Formula 2]

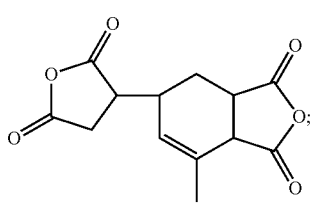

[Formula 3]

-continued

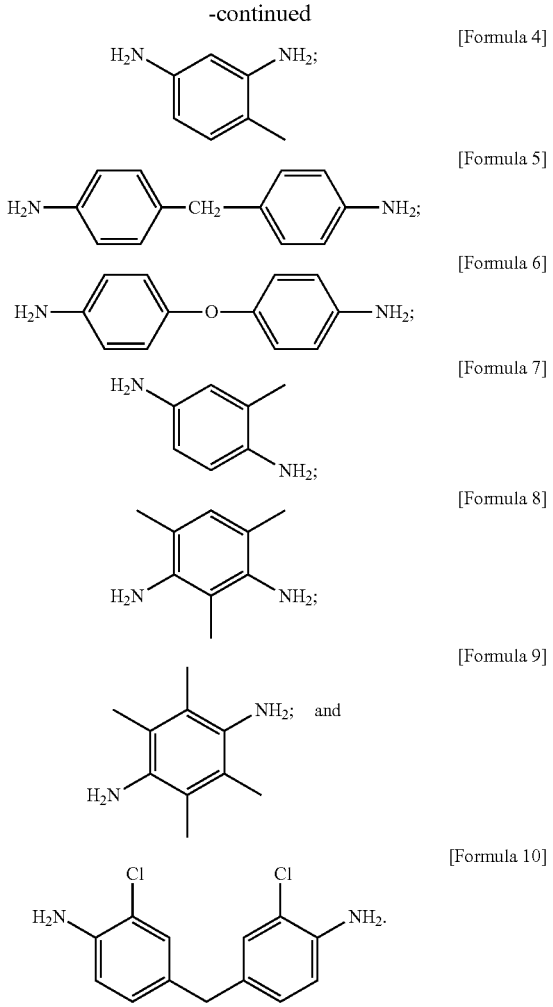

[Formula 4]

[Formula 5]

[Formula 6]

[Formula 7]

[Formula 8]

[Formula 9]

and

[Formula 10]

Particularly, the monomer compound of formula 2 is the alicyclic dianhydride compound DOCDA (5-(2,5-dioxotetrahydrofuryl)-3-methyl-3-cyclohexene-1,2-dicarboxylic anhydride) that displays excellent solubility in organic solvents owing to its alicyclic ring structure that is advantageous in making torsion or asymmetry in the main chain, and the monomer compounds represented by formula 3~formula 10 are the aromatic diamine compounds MDA (4,4'-Methylene dianiline), ODA (4,4'-Oxy dianiline), p-PDA (para-phenylenediamine), m-TDA (meta-toluenediamine), p-TDA (para-toluenediamine), TrMPD (2,4,6-Trimethyl-1,3-phenylenediamine), TeMPD (2,3,5,6-Tetramethyl-1,4-phenylenediamine), and MBCA (4,4'-Methylenebis(2-chloroaniline)).

In the method for preparing the polyimide-based macromolecular compound of the present invention, the polycondensation is induced between the DOCDA monomer compound of formula 2 and one or more monomer compounds selected from the group consisting of MDA, ODA, P-PDA, m-TDA, TrMPD, TeMPD, and MBCA represented by formula 3~formula 10, respectively, by forming an imide ring by polymerization when a water molecule is dehydrated.

In the method for preparing the polyimide-based macromolecular compound of the present invention, the reaction temperature is preferably 150° C.~203° C. If the reaction temperature is lower than 150° C., the efficiency of imidation decreases and the efficiency of polymerization also decreases. Considering the boiling point of metacresol is 203° C., it is preferred not to raise the reaction temperature higher than 203° C.

The present invention also provides a gas-separation asymmetrical hollow-fibre membrane comprising the said polyimide-based macromolecular compound, wherein the gas to be separated is preferably methane.

As shown in Table 3 and Table 4 according to the Experimental Example 5 of the present invention, the hollow-fibre membrane prepared by using a dry jet-wet spinning device had more excellent pure gas permeability than the flat membrane prepared by casting the polyimide-based macromolecular compound solution on the glass board. Therefore, the hollow-fibre membrane of the present invention was confirmed to be more efficiently used for the gas separation. As shown in Table 3 and Table 4 according to the Experimental Example 5 of the present invention, the pure gas permeability of methane was significantly lower than those of the other gases. So, the asymmetrical hollow-fibre membrane of the present invention was more advantageous for the separation of gas, particularly methane.

The present invention further provides a method for preparing the gas-separation asymmetrical hollow-fibre membrane containing the following steps:

preparing a spinning solution composed of the said polyimide-based macromolecular compound, a non-polar organic solvent having a high boiling point, a non-solvent having a low boiling point, and a foaming agent that is another non-solvent having a high boiling point (step 1); and;

spinning the spinning solution prepared in step 1) by using a dry jet-wet spinning device equipped with a duplex tube type nozzle in the presence of an internal coagulant (step 2).

Hereinafter, the method for preparing the gas-separation asymmetrical hollow-fibre membrane of the present invention is described in more detail.

In the method for preparing the hollow-fibre membrane according the present invention, the step 1) is to prepare a spinning solution comprising the polyimide-based macromolecular compound of the invention, a film-forming solvent having a high boiling point, a non-solvent having a low boiling point, and a foaming agent that is another non-solvent having a high boiling point.

Particularly, in the method for preparing the hollow-fibre membrane according to the present invention, the spinning solution of step 1) contains the polyimide-based macromolecular compound having gas selectivity preferably at the concentration of 20~40 weight % and more preferably 25~35 weight %. If the concentration of the polyimide-based macromolecular compound is loss than 20%, the viscosity would be too low to make the hollow-fibre membrane strong and to keep the gas separation selectivity. In the meantime, if the concentration of the polyimide-based macromolecular compound is higher than 40 weight %, the viscosity goes too high to spinning the solution in the form of hollow-fibre.

In the method for preparing the hollow-fibre membrane according to the present invention, the organic solvent having a high boiling point in step 1) plays a role in dissolving the polyimide-based macromolecular compound. At this time, one or more organic solvents can be selected from the group consisting of N-methylpyrrolidone, dimethylacetamide, and dimethylformamide.

Further, in the method for preparing the hollow-fibre membrane according to the present invention, the non-solvent having a low boiling point of step 1) does not dissolve the polyimide-based macromolecular compound but expands thereof, suggesting that the non-solvent plays a role in forming a skin layer with gas selectivity. At this time, one or more non-solvents can be selected from the group consisting of tetrahydrofuran (THF), acetone, methanol, and ethanol.

In the method for preparing the hollow-fibre membrane according the present invention, the non-solvent having a high boiling point of step 1) helps the pore formation of the hollow-fibre membrane, which can be one or more non-solvents selected from the group consisting of butanol, isopropylalcohol, dimethoxyethanol, dimethoxy butyleneoxide, butoxymethanol, butoxyethanol, and diglycidyldimethylether.

In the method for preparing the hollow-fibre membrane according the present invention, the internal coagulant of step 1) is prepared by mixing the organic solvent having a high boiling point and the non-solvent having a low boiling point; and the spinning solution contains the organic solvent having a high boiling point and the non-solvent having a low boiling point, which are included in the internal coagulant of step 1), and the foaming agent that is another non-solvent having a high boiling point at the ratio of 80:10:10~60:20:20, and more preferably at the ratio of 75:15:10~65:25:10. If the ratio of the organic solvent having a high boiling point is lower than 60, the selection layer on the hollow-fibre surface would become too thick, resulting in the decrease of permeability. On the other hand, if the ratio of the organic solvent having a high boiling point is more than 80, the selection layer itself is hardly formed, resulting in the decrease of selectivity.

The present invention also provides a method for the separation of mixed gas containing the step of separating the mixed gas by using one gas-separation asymmetrical hollow-fibre membrane according to the present invention. The mixed gas herein includes $CH_4$ mixed gas generated in the land fill site and in the course of anaerobic degradation of organic waste such as livestock waste, sewage sludge, and food waste; combustion flue gas generated in the course of burning fossil fuel such as coal and natural gas; $O_2/N_2$/vapor in the air; and CO2/H2/CO mixture generated in the course of IGCC (Integrated Gasification Combined Cycle) or the production of $H_2$. The hollow-fibre membrane of the present invention can be efficiently used for the separation of various gases including $CH_4$, $CO_2$, $O_2$, $H_2S$, $N_2$, $H_2$, vapor, $O_2$ and $N_2$, and $N_2$ and $CO_2$ from the mixed gas.

In the method for the separation of mixed gas according to the present invention, the mixed gas is preferably $CH_4$ gas mixture. Referring to Table 4 according to the Experimental Example 5, the hollow-fibre membrane of the invention displays specifically higher pure gas permeability for $CO_2$, while it shows significantly low pure gas permeability for $CH_4$, suggesting that the membrane of the invention has the best selectivity of $CO_2/CH_4$. Thus, the method for the separation of mixed gas of the present invention is preferably the separation method for $CO_2/CH_4$ mixed gas, and more preferably the method for separating $CH_4$ from biogas.

Practical and presently preferred embodiments of the present invention are illustrative as shown in the following Examples.

However, it will be appreciated that those skilled in the art, on consideration of this disclosure, may make modifications and improvements within the spirit and scope of the present invention.

Example 1

Preparation of Polyimide-Based Macromolecular Compound-1

The alicyclic dianhydride monomer DOCDA and the aromatic diamine monomer MDA (4,4'-Methylene dianiline) were loaded in different round glass flasks, to which a mechanical stirrer, a thermometer, and a condenser were attached. DOCDA (26.4 g; 0.1 mol) and MDA (19.8 g; 0.1 mol) were dissolved in m-cresol in nitrogen atmosphere. Then, the mixture was stirred at 60~70° C. for 2 hours and at 200° C. for 18 hours. As a result, a polyimide solution with high molecular weight was obtained. The prepared polyimide solution was diluted with dimethylformamide (DMF), which was slowly dropped in the beaker containing methanol, resulting in the precipitation. The precipitate was washed with excessive methanol. The polyimide powder was vacuum-dried at 60° C. for 12 hours after the washing, and as a result the polyimide macromolecular compound (DOCDA-MDA) was obtained.

Example 2

Preparation of Polyimide-Based Macromolecular Compound-2

The polyimide-based macromolecular compound DOCDA-ODA was prepared by the same manner as described in Example 1 except that ODA (4,4'-Oxy dianiline: 20.0 g, 0.01 mol) was used as an aromatic diamine monomer instead of MDA (4.4'-Methylene dianiline).

Example 3

Preparation of Polyimide-Based Macromolecular Compound-3

The polyimide-based macromolecular compound DOCDA-p-PDA was prepared by the same manner as described in Example 1 except that p-PDA (para-phenylenediamine: 0.1 mol) was used as an aromatic diamine monomer instead of MDA (4.4'-Methylene dianiline).

Example 4

Preparation of Polyimide-Based Macromolecular Compound-4

The polyimide-based macromolecular compound DOCDA-m-TDA was prepared by the same manner as described in Example 1 except that m-TDA (meta-toluenediamine: 0.1 mol) was used as an aromatic diamine monomer instead of MDA (4.4'-Methylene dianiline).

Example 5

Preparation of Polyimide-Based Macromolecular Compound-5

The polyimide-based macromolecular compound DOCDA-m-TDA was prepared by the same manner as described in Example 1 except that p-TDA (para-toluenediamine: 0.1 mol) was used as an aromatic diamine monomer instead of MDA (4.4'-Methylene dianiline).

Example 6

Preparation of Polyimide-Based Macromolecular Compound-6

The polyimide-based macromolecular compound DOCDA-m-TDA was prepared by the same manner as described in Example 1 except that TrMPD (2,4,6-Trimethyl-1,3-phenylenediamine: 0.1 mol) was used as an aromatic diamine monomer instead or MDA (4.4'-Methylene dianiline).

Example 7

Preparation of Polyimide-Based Macromolecular Compound-7

The polyimide-based macromolecular compound DOCDA-m-TDA was prepared by the same manner as described in Example 1 except that TeMPD (2,3,5,6-Tetramethyl-1,4-phenylenediamine: 0.1 mol) was used as an aromatic diamine monomer instead of MDA (4.4'-Methylene dianiline).

Example 8

Preparation of Polyimide-Based Macromolecular Compound-8

The polyimide-based macromolecular compound DOCDA-m-TDA was prepared by the same manner as described in Example 1 except that MBCA (4,4'-Methylenebis(2-chloroaniline) 0.1 mol) was used as an aromatic diamine monomer instead of MDA (4.4'-Methylene dianiline).

Example 9

Preparation of Polyimide-Based Macromolecular Compound-9

The polyimide-based macromolecular compound DOCDA-m-TDA+MDA was prepared by the same manner as described in Example 1 except that m-TDA:MDA=1:1 mixture (0.1 mol) was used as an aromatic diamine monomer instead of MDA (4.4'-Methylene dianiline).

Example 10

Preparation of Polyimide-Based Macromolecular Compound-10

The polyimide-based macromolecular compound DOCDA-m-TDA+MBA was prepared by the same manner as described in Example 1 except that p-PDA:MDA=1:1 mixture (0.1 mol) was used as an aromatic diamine monomer instead of MDA (4.4'-Methylene dianiline).

Example 11

Preparation of Polyimide-Based Macromolecular Compound-11

The polyimide-based macromolecular compound DOCDA-ODA+MDA was prepared by the same manner as described in Example 1 except that ODA:MDA=1:1 mixture (0.1 mol) was used as an aromatic diamine monomer instead of MDA (4.4'-Methylene dianiline).

Example 12

Preparation of Polyimide-Based Macromolecular Compound-12

The polyimide-based macromolecular compound DOCDA-m-TDA+ODA was prepared by the same manner as described in Example 1 except that m-TDA:ODA=1:1 mixture (0.1 mol) was used as an aromatic diamine monomer instead of MDA (4.4'-Methylene dianiline).

Example 13

Preparation of Polyimide-Based Macromolecular Compound-13

The polyimide-based macromolecular compound DOCDA-p-PDA+ODA was prepared by the same manner as described in Example 1 except that p-PDA:ODA=1:1 mixture (0.1 mol) was used as an aromatic diamine monomer instead of MDA (4.4'-Methylene dianiline).

Example 14

Preparation of Polyimide-Based Macromolecular Compound-14

The polyimide-based macromolecular compound DOCDA-p-PDA+ODA was prepared by the same manner as described in Example 1 except that TeMPD:ODA=1:1 mixture (0.1 mol) was used as an aromatic diamine monomer instead of MDA (4.4'-Methylene dianiline).

Example 15

Preparation of Polyimide-Based Macromolecular Compound-15

The polyimide-based macromolecular compound DOCDA-p-PDA+ODA was prepared by the same manner as described in Example 1 except that MBCA:ODA=1:1 mixture (0.1 mol) was used as an aromatic diamine monomer instead of MDA (4.4'-Methylene dianiline).

Example 16

Preparation of Polyimide-Based Macromolecular Compound-16

The polyimide-based macromolecular compound DOCDA-p-PDA+ODA was prepared by the same manner as described in Example 1 except that TeMPD:MDA=1:1 mixture (0.1 mol) was used as an aromatic diamine monomer instead of MDA (4.4'-Methylene dianiline).

Example 17

Preparation of Polyimide-Based Macromolecular Compound-17

The polyimide-based macromolecular compound DOCDA-p-PDA+ODA was prepared by the same manner as described in Example 1 except that MBCA:MDA=1:1 mixture (0.1 mol) was used as an aromatic diamine monomer instead of MDA (4.4'-Methylene dianiline).

Comparative Example 1

Preparation of Polyimide-Based Macromolecular Compound-18

A polyimide-based macromolecular compound was prepared by the same manner as described in Example 1 except that IPDA (4,4'-Isopropylene dianiline: 22.6 g 0.1 mol) was used as an aromatic diamine monomer instead of MDA (4.4'-Methylene dianiline).

Comparative Example 2

Preparation of Polyimide-Based Macromolecular Compound-19

A polyimide-based macromolecular compound was prepared by the same manner as described in Example 1 except that 4-BAPB (1,4-bis-(4-aminophenoxy)-benzene: 29.2 g 0.1 mol) was used as an aromatic diamine monomer instead of MDA (4.4'-Methylene dianiline).

Comparative Example 3

Preparation of Polyimide-Based Macromolecular Compound-20

A polyimide-based macromolecular compound was prepared by the same manner as described in Example 1 except that 4APPP (2,2-bis-[4-(aminophenoxy)-phenyl]-propane: 0.1 mol) was used as an aromatic diamine monomer instead of MDA (4.4'-Methylene dianiline).

Comparative Example 4

Preparation of Polyimide-Based Macromolecular Compound-21

A polyimide-based macromolecular compound was prepared by the same manner as described in Example 1 except that BAPBP (4,4'-bis-(4-aminophenoxy)-biphenyl: 0.1 mol) was used as an aromatic diamine monomer instead of MDA (4.4'-Methylene dianiline).

Comparative Example 5

Preparation of Polyimide-Based Macromolecular Compound-22

A polyimide-based macromolecular compound was prepared by the same manner as described in Example 1 except that 3-BAPB (1,3-bis-(4-aminophenoxy)-benzene: 0.1 mol) was used as an aromatic diamine monomer instead of MDA (4.4'-Methylene dianiline).

Comparative Example 6

Preparation of Polyimide-Based Macromolecular Compound-23

A polyimide-based macromolecular compound was prepared by the same manner as described in Example 1 except that BAPP (2,2-bis[4-(4-aminophenoxy)-phenyl]propane: 0.1 mol) was used as an aromatic diamine monomer instead of MDA (4.4'-Methylene dianiline).

Examples 18~34

Preparation of Flat Membrane Comprising Polyimide-Based Macromolecular Compound 1~17

The polyimide-based macromolecular compounds prepared in Examples 1~17 were dissolved in dimethylformamide (DMF) at the concentration of 10 weight % as the gas selection macromolecules, which was casted on the glass plate. Then, the plate was dried in a vacuum oven at 60° C. for 24 hours, and then dried again at 130° C. for 12 hours, resulting in the preparation of 50 μm thick dense flat membranes.

Comparative Examples 7~12

Preparation of Flat Membrane Comprising Polyimide-Based Macromolecular Compound 18~23

50 μm thick dense flat membranes were prepared by the same manner as described in Examples 18~34 except that the polyimide-based macromolecular compounds prepared in Comparative Examples 1~6 were used as the gas selection macromolecules instead of those polyimide-based macromolecular compounds prepared in Examples 1~17.

Examples 35~51

Preparation of Hollow-Fibre Membrane Comprising Polyimide-Based Macromolecular Compound 1~17

350 g of each of the polyimide-based macromolecular compounds prepared in Examples 1~17 was loaded in a 2000 ml round flask ( ) as a gas selection macromolecule, to which 400 g of dimethylacetylamide (DMAc) as a solvent with a high boiling point, 150 g of butoxy ethanol as a non-solvent with a high boiling point, and 100 g of tetranydrofuran (THF) as a non-solvent with a low boiling point were added. The gas selection macromolecule was completely dissolved, resulting in the preparation of a 35% polymer solution. Air bubbles generated in the polymer solution during the preparation of the polymer solution were eliminated with reducing the pressure by using a vacuum pump, resulting in the preparation of a spinning solution. Next, dimethylacetylamide (DMAc) and glycerin were mixed at the ratio of 70:30, resulting in the preparation of an internal coagulant. A hollow-fibre membrane was prepared with the prepared spinning solution and the internal coagulant by using a dry jet-wet spinning device as shown in FIG. 1 under reduced pressure.

Particularly, the device to prepare the hollow-fibre membrane shown in FIG. 1 supplied the spinning solution at a certain flow rate through a gear pump out of the duplex tube type nozzle and provided the internal coagulant at a certain flow rate through a fluid transfer pump (HPLC pump) into the duplex tube type nozzle of the spinning device. The hollow-fibre coming out of the duplex tube type nozzle of the spinning device passed through air-gap in a certain section, during which phase transition between the spinning and the internal coagulant began in order to form an internal channel in the hollow-fibre membrane. Then, the membrane passed the first, coagulation bath (water) and then passed, the second coagulation bath at a regular speed using a tension controller, followed by hot water treatment. The membrane was contacted with the non-solvent therein, leading to the diffusion. The remaining solvent was eliminated and the membrane was soaked in the last winding bath. The processed hollow-fibre membrane above was dried in a 50° C. oven for at least 48 hours, leading to the completion of the hollow-fibre membrane of the present invention. At this time, the air-gap was 5 cm, and the spinning speed was 75 m/min, and the spinning temperature was 170° C. Additionally to avoid any defect in the surface of the hollow-fibre membrane, polydimethylsiloxane was dissolved in hexane at the concentration of 3 weight %, and the dried hollow-fibre membrane was coated with this solution continuously.

Finally, the external diameter, the cross section, and the outer and inner surface structure of the prepared hollow-fibre were examined under scanning electron microscope (JEOL-840A). As a result, the external diameter of the prepared hollow-fibre was approximately 400 μm and the internal diameter was approximately 200~250 μm.

Experimental Example 1~2

Analysis of $^1$H-NMR and FT-IR Spectra

Figure 2:
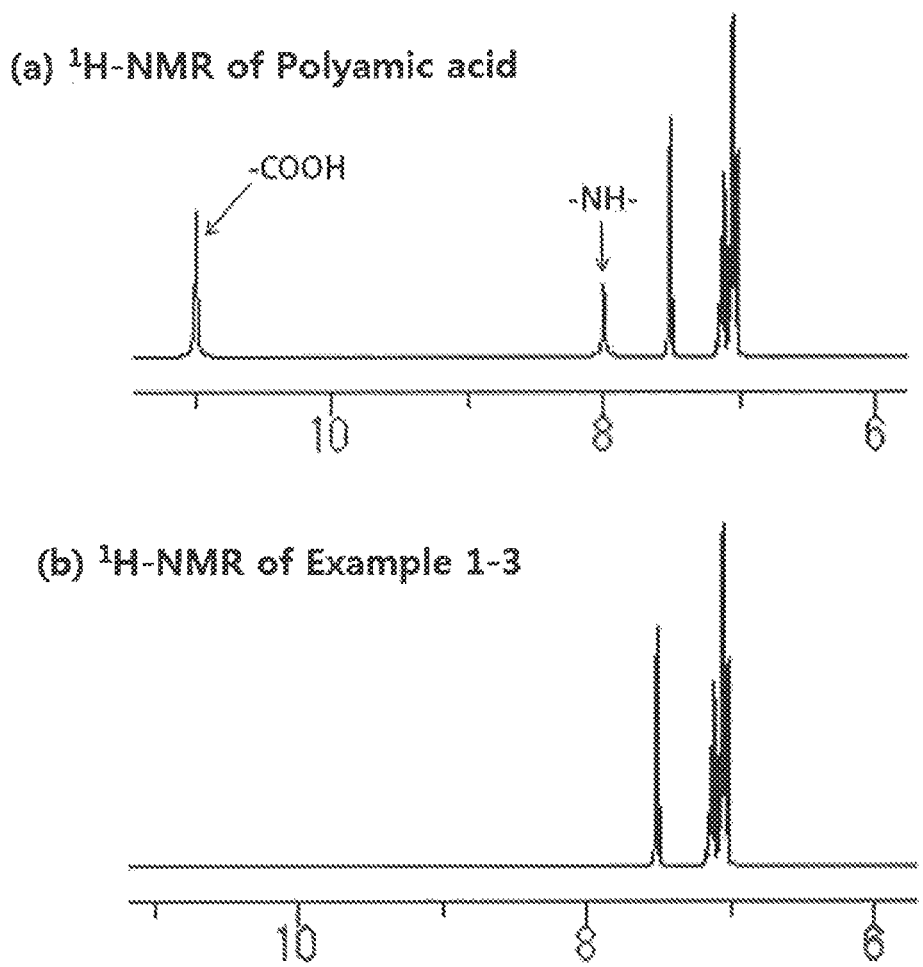
FIG. 2 is a graph illustrating $^1$H-NMR spectrum of the polyimide-based macromolecular compound of the present invention and polyamic acid.
Figure 3:
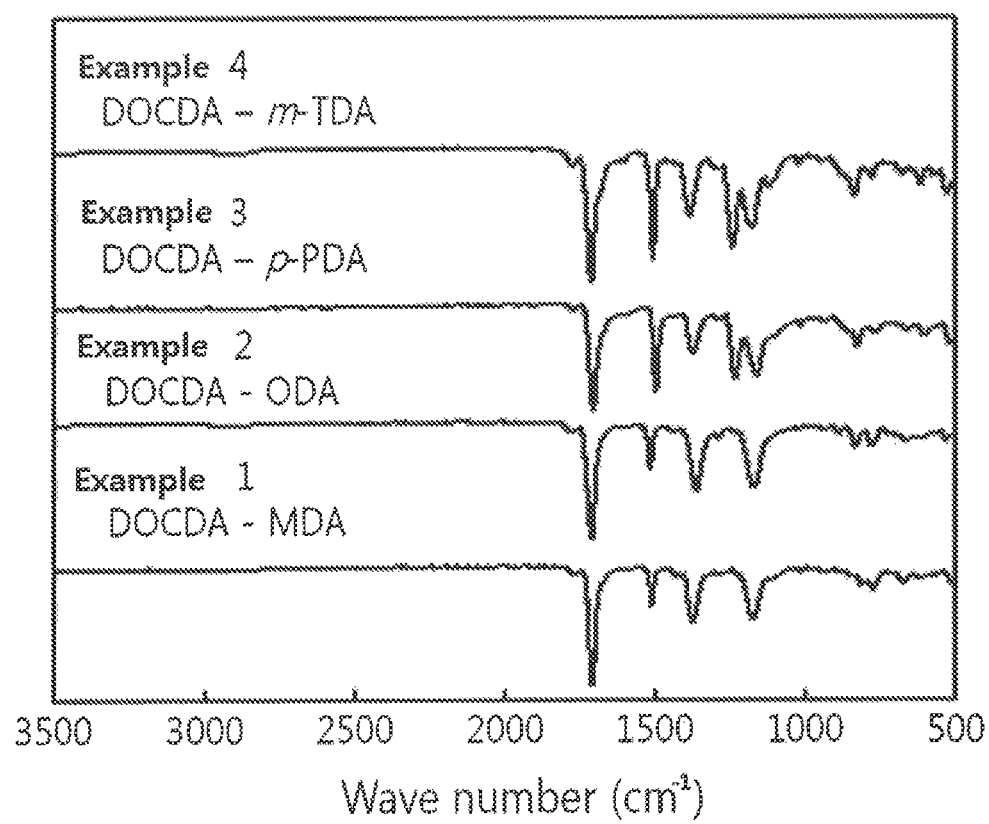
FIG. 3 is a graph illustrating FT-IR spectrum of the polyimide-based macromolecular compound of the present invention.

To confirm whether or not the polyimide-based macromolecular compound of the invention was successfully synthesized according to Examples 1~6, $^1$H-NMR ($^1$H-nuclear magnetic resonance spectroscopy) and FT-IR (Fourier transform infrared spectroscopy) spectra for the macromolecular compounds prepared in Examples 1~8 were examined and the results are shown in FIG. 2 and FIG. 3. $^1$H-NMR was measured by using Bruker DRX-300 FT-NMR Spectrometer and FT-IR was measured by using Bio-Rad Digilab FTS-165 FT-IR Spectrometer.

Among the $^1$H-NMR spectra of the primary condensate polyamic acid produced from the reaction shown in FIG. 2 and of polyimide after the completion of the reaction, the peak presenting the characteristics of aromatic compound and the peak presenting polar proton were monitored. As a result, the macromolecular compounds prepared in Example 1~8 of the present invention were confirmed to be completed with imidization since they lost 11 ppm (—COCH) and 8 ppm (—NH—) peaks presenting the characteristics of polyamic acid.

FT-IR spectra of the polyimide-based macromolecular compounds prepared in Examples 1~4 as shown in FIG. 3 were also examined. O—H stretching peak (3200 cm$^{-1}$) and N—H stretching peak (3350 cm$^{-1}$), which were the polyamic acid absorption bands, were not observed. Instead, asymmetrical C=O stretching and symmetrical C=O stretching peaks were observed at 1780 cm$^{-1}$ and 1710 cm$^{-1}$. Also, C—N—C stretching peak was shown at 1380 cm$^{-1}$, suggesting that polyimide was successful synthesized.

Experimental Example 3

Analysis of Intrinsic Viscosity

To investigate whether or not the polyimide-based macromolecular compounds of the present invention had enough viscosity for spinning to prepare the hollow-fibre membrane of the invention, the intrinsic viscosity of the polyimide-based macromolecular compounds prepared in Examples 1~8 and the commercialized gas separation membrane macromolecules of Comparative Examples 1~6 was measured and the results are shown in Table 1. To measure the intrinsic viscosity, the polyimide-based macromolecular compounds were dissolved in dimethylacetamide (DMAc) at the concentration of 0.5 g/dL and then intrinsic viscosity was measured at 30° C. by using Cannon-Fenske viscometer.

TABLE 1

|  | Intrinsic Viscosity (dL/g) |
| --- | --- |
| Example 1 (DOCDA-MDA) | 1.11 |
| Example 2 (DOCDA-ODA) | 0.45 |

TABLE 1-continued

|  | Intrinsic Viscosity (dL/g) |
| --- | --- |
| Example 3 (DOCDA-p-PDA) | 0.35 |
| Example 4 (DOCDA-m-TDA) | 0.46 |
| Example 5 (DOCDA-p-TDA) | 0.41 |
| Example 6 (DOCDA-TrMPD) | 0.52 |
| Example 7 (DOCDA-TeMPD) | 0.60 |
| Example 8 (DOCDA-MBCA) | 0.51 |
| Comparative Example 1 (DOCDA-IPDA) | 0.49 |
| Comparative Example 2 (DOCDA-4BAPB) | 0.62 |
| Comparative Example 3 (DOCDA-4APPP) | 0.39 |
| Comparative Example 4 (DOCDA-BAPBP) | 0.43 |
| Comparative Example 5 (DOCDA-3BAPB) | 0.53 |
| Comparative Example 6 (DOCDA-BAPP) | 0.42 |

As shown in Table 1, the intrinsic viscosity of the polyimide-based macromolecular compound of Example 1 (DOCOD-MDA) was 1.11 dL/g; the intrinsic viscosity of the polyimide-based macromolecular compound of Example 2 (DOCDA_ODA) was 0.45 dL/g; the intrinsic viscosity of the polyimide-based macromolecular compound of Example 3 (DOCDA-p-PDA) was 0.35 dL/g; the intrinsic viscosity of the polyimide-based macromolecular compound of Example 4 (DOCDA-m-TDA) was 0.46 dL/g; the intrinsic viscosity of the polyimide-based macromolecular compound of Example 5 (DOCDA-p-TDA) was 0.41 dL/g; the intrinsic viscosity of the polyimide-based macromolecular compound of Example 6 (DOCDA-TrMPD) was 0.32 dL/g; the intrinsic viscosity of the polyimide-based macromolecular compound of Example 7 (DOCDA-TeMPD) was 0.60 dL/g; and the intrinsic viscosity of the polyamide-based macromolecular compound of Example 8 (DOCDA-MBCA) was 0.51 dL/g. Compared with the intrinsic viscosity of the commercialized gas separation membrane macromolecules of Comparative Examples 1~6, the intrinsic viscosity of the compounds of the invention was not much different. Therefore, the polyimide-based macromolecular compounds of the invention were confirmed to have high viscosity enough to be used for spinning to prepared the hollow-fibre membrane.

Experimental Example 4

Analysis of Solubility in Organic Solvents

To investigate whether or not the polyimide-based macromolecular compounds of the present invention had excellent solubility in organic solvents in order to be applied to phase transition process for the preparation of the hollow-fibre membrane, the present inventors first measured the intrinsic viscosity of those polyimide-based macromolecular compounds of Examples 1~3 and the commercialized gas separation membrane macromolecules of Comparative Examples 1~4, and the results are shown in Table 2. For the investigation of solubility, the organic solvents listed in Table 2 were used. Before measuring the viscosity, the reaction solution was stirred at room temperature for 24 hours. To distinguish the difference of solubility, when the compound was completely dissolved, it was presented as ++, and when the compound was partly dissolved, it was presented as +, and when the compound was not dissolved, it was presented as −.

TABLE 2

|  | NMP | DMAc | DMF | DMSO | THF | AC | CF | EA | MC | TOL |
|---|---|---|---|---|---|---|---|---|---|---|
| Example 1 (DOCDA-MDA) | ++ | ++ | ++ | ++ | − | + | + | − | + | − |
| Example 2 (DOCDA-ODA) | ++ | ++ | ++ | ++ | − | − | + | + | + | − |
| Example 3 (DOCDA-p-PDA) | ++ | ++ | ++ | ++ | − | − | − | − | − | − |
| Comparative Example 1 (DOCDA-IPDA) | ++ | ++ | ++ | ++ | − | − | + | − | − | − |
| Comparative Example 2 (DOCDA-BAPB) | ++ | ++ | ++ | + | − | − | − | − | + | − |
| Comparative Example 3 (DOCDA-APPP) | ++ | ++ | ++ | − | − | − | + | − | + | − |
| Comparative Example 4 (DOCDA-BAPBP) | ++ | ++ | ++ | ++ | − | − | + | − | + | − |

As shown in Table 2, the polyimide-based macromolecular compounds prepared in Examples 1~3 were confirmed to have excellent solubility in different organic solvents, compared with the commercialized gas separation membrane macromolecules. Therefore, it was confirmed that the polyimide-based macromolecular compounds of the present invention can be easily applied for the process of phase transition in the course of the preparation of the hollow-fibre membrane.

Experimental Example 5

Analysis of Gas Permeability and Selectivity

To investigate whether or not the gas separation membrane comprising the polyimide-based macromolecular compound of the present invention had excellent gas permeability and selectivity, the flat membranes of Examples 18~34 and the hollow-fibre membranes of Examples 35~51 were given with the upper pressure of 2000 torr and the lower pressure of 2 torr at 25° C., under which the permeability of $CH_4$, $N_2$, $O_2$, and $CO_2$ and the selectivity of $CO_2/CH_4$, $CO_2/N_2$, $O_2/N_2$, and $N_2/CH_4$ were measured. The performance of the gas separation membrane depends on the permeation rate of a specific gas on the gas separation material and the selectivity that means which component of the gas mixture would be allowed to penetrate, which is determined based on the comparative ratio of permeability of each component. In general, permeability and selectivity are measured.

As shown in the below mathematical formula 1, the permeability is presented as Barrer, the normalized coefficient of pressure, area, and thickness of a specific sample material. In the case of a combined membrane, in order to present the permeability of the processed material for the separation membrane, the permeability is presented as GPU (gas permeation rate) that is the coefficient normalized with pressure and area as shown in mathematical formula 2. Further, the selectivity is presented as the ratio to the permeability of a target gas, and the unit thereof is dimensionless. The selectivity of $CO_2/CH_4$ is presented in mathematical formula 3. The results produced by the mathematical formulas below are shown in Table 3 and Table 4. In Table 3, the pure gas permeability (GPU) and the selectivity of the flat membrane are presented. In Table 4, the pure gas permeability (GPU) and the selectivity of the hollow-fibre membrane are presented.

$$1\ Barrer = 10^{-10} \times \frac{cc(STP) \times cm}{cm^2 \times s \times cmHg} \quad \text{[Mathematical Formula 1]}$$

$$1\ GPU = 10^{-6} \times \frac{cc(STP)}{cm^2 \times s \times cmHg} \quad \text{[Mathematical Formula 2]}$$

$$\alpha = \frac{Q(CO_2)}{Q(CH_4)} \quad \text{[Mathematical Formula 3]}$$

TABLE 3

|  | Pure Gas Permeability (Barrer) | | | | Selectivity ($a_{A/B}$) | | | |
|---|---|---|---|---|---|---|---|---|
|  | $P_{CO2}$ | $P_{O2}$ | $P_{N2}$ | $P_{CH4}$ | $P_{CO2}/P_{CH4}$ | $P_{CO2}/P_{N2}$ | $P_{O2}/P_{N2}$ | $P_{N2}/P_{CH4}$ |
| Example 18 (DOCDA-MDA) | 3.1 | 0.55 | 0.09 | 0.06 | 51.1 | 33.6 | 6.1 | 1.5 |
| Example 19 (DOCDA-ODA) | 6.1 | 1.2 | 0.17 | 0.09 | 67.0 | 35.9 | 6.9 | 1.9 |
| Example 20 (DOCDA-p-PDA) | 0.7 | 0.3 | 0.04 | 0.02 | 46.3 | 17.6 | 6.0 | 2.6 |

TABLE 3-continued

| | Pure Gas Permeability (Barrer) | | | | Selectivity ($a_{A/B}$) | | | |
|---|---|---|---|---|---|---|---|---|
| | $P_{CO2}$ | $P_{O2}$ | $P_{N2}$ | $P_{CH4}$ | $P_{CO2}/P_{CH4}$ | $P_{CO2}/P_{N2}$ | $P_{O2}/P_{N2}$ | $P_{N2}/P_{CH4}$ |
| Example 21 (DOCDA-m-TDA) | 27.9 | 5.7 | 0.87 | 0.57 | 48.95 | 32.07 | 6.55 | 1.53 |
| Example 22 (DOCDA-p-TDA) | 29.2 | 6.9 | 1.02 | 0.62 | 47.1 | 28.63 | 6.76 | 1.65 |
| Example 23 (DOCDA-TrMPD) | 31.6 | 6.9 | 1.04 | 0.58 | 54.48 | 30.38 | 6.63 | 1.79 |
| Example 24 (DOCDA-TeMPD) | 33.4 | 7.3 | 1.1 | 0.65 | 51.38 | 30.36 | 6.64 | 1.69 |
| Example 25 (DOCDA-MBCA) | 32.6 | 5.9 | 1.03 | 0.56 | 58.21 | 31.65 | 5.73 | 1.84 |
| Example 26 (DOCDA-m-TDA + MDA) | 34.2 | 6.78 | 1.02 | 0.69 | 49.57 | 33.53 | 6.65 | 1.48 |
| Example 27 (DOCDA-p-PDA + MDA) | 0.98 | 0.2 | 0.03 | 0.019 | 51.58 | 32.67 | 6.67 | 1.58 |
| Example 28 (DOCDA-ODA + MDA) | 8.6 | 1.87 | 0.27 | 0.16 | 53.75 | 31.85 | 6.93 | 1.69 |
| Example 29 (DOCDA-m-TDA + ODA) | 38.4 | 7.5 | 1.12 | 0.73 | 52.60 | 34.29 | 6.7 | 1.53 |
| Example 30 (DOCDA-p-PDA + ODA) | 1.4 | 0.25 | 0.04 | 0.025 | 56 | 35 | 6.25 | 1.6 |
| Example 31 (DOCDA-TeMPD-ODA) | 9.5 | 1.9 | 0.34 | 0.29 | 32.7 | 27.9 | 5.5 | 1.2 |
| Example 32 (DOCDA-MBCA + ODA) | 6.0 | 2.4 | 0.5 | 0.21 | 28.6 | 12.0 | 4.8 | 2.4 |
| Example 33 (DOCDA-TeMPD + MDA) | 4.9 | 1.1 | 0.21 | 0.12 | 40.8 | 23.3 | 5.2 | 1.7 |
| Example 34 (DOCDA-MBCA + MDA) | 1.5 | 0.4 | 0.07 | 0.05 | 30.0 | 21.4 | 5.6 | 1.4 |
| Comparative Example 5 (DOCDA-IPDA) | 9.5 | 1.9 | 0.34 | 0.29 | 32.7 | 27.9 | 5.5 | 1.2 |
| Comparative Example 6 (DOCDA-BAPB) | 6.0 | 2.4 | 0.5 | 0.21 | 28.6 | 12.0 | 4.8 | 2.4 |
| Comparative Example 7 (DOCDA-APPP) | 4.9 | 1.1 | 0.21 | 0.12 | 40.8 | 23.3 | 5.2 | 1.7 |
| Comparative Example 8 (DOCDA-BAPBP) | 1.5 | 0.4 | 0.07 | 0.05 | 30.0 | 21.4 | 5.6 | 1.4 |
| Comparative Example 9 (DOCDA-3BAPB) | 3.5 | 1.1 | 0.2 | 0.12 | 29.17 | 17.5 | 5.5 | 1.67 |
| Comparative Example 10 (DOCDA-BAPP) | 0.9 | 0.29 | 0.051 | 0.032 | 28.13 | 17.65 | 5.69 | 1.59 |

TABLE 4

| | Pure Gas Permeability (GPU) | | | | Selectivity ($a_{A/B}$) | | | |
|---|---|---|---|---|---|---|---|---|
| | $P_{CO2}$ | $P_{O2}$ | $P_{N2}$ | $P_{CH4}$ | $P_{CO2}/P_{CH4}$ | $P_{CO2}/P_{N2}$ | $P_{O2}/P_{N2}$ | $P_{N2}/P_{CH4}$ |
| Example 35 (DOCDA-MDA) | 95 | 15.8 | 3.0 | 2.4 | 38 | 33.6 | 5.3 | 1.5 |
| Example 36 (DOCDA-ODA) | 200 | 60 | 6.0 | 3.3 | 60 | 35.9 | 6.0 | 1.9 |
| Example 37 (DOCDA-p-PDA) | 72 | 14.8 | 2.8 | 2.0 | 36 | 17.6 | 5.3 | 2.6 |
| Example 38 (DOCDA-m-TDA) | 108 | 20.3 | 3.8 | 2.9 | 37 | 28.4 | 5.3 | 1.3 |

TABLE 4-continued

| | Pure Gas Permeability (GPU) | | | | Selectivity ($a_{A/B}$) | | | |
|---|---|---|---|---|---|---|---|---|
| | $P_{CO2}$ | $P_{O2}$ | $P_{N2}$ | $P_{CH4}$ | $P_{CO2}/P_{CH4}$ | $P_{CO2}/P_{N2}$ | $P_{O2}/P_{N2}$ | $P_{N2}/P_{CH4}$ |
| Example 39 (DOCDA-p-TDA) | 122 | 20.4 | 3.9 | 2.9 | 42.07 | 31.28 | 5.23 | 1.34 |
| Example 40 (DOCDA-TrMPD) | 148 | 21.2 | 4.2 | 2.9 | 51.03 | 35.24 | 5.05 | 1.45 |
| Example 41 (DOCDA-TeMPD) | 184 | 23.3 | 5.2 | 3.7 | 49.73 | 35.38 | 4.48 | 1.41 |
| Example 42 (DOCDA-MBCA) | 162 | 21.6 | 4.6 | 3.0 | 54 | 35.22 | 4.67 | 1.53 |
| Example 43 (DOCDA-m-TDA + MDA) | 203 | 41 | 6.9 | 4.77 | 42.56 | 29.42 | 5.94 | 1.45 |
| Example 44 (DOCDA-p-PDA + MDA) | 78 | 18 | 3 | 1.84 | 42.39 | 26 | 6 | 1.63 |
| Example 45 (DOCDA-ODA + MDA) | 101 | 22.1 | 3.2 | 2.26 | 44.69 | 31.56 | 6.91 | 1.42 |
| Example 46 (DOCDA-m-TDA + ODA) | 209 | 47 | 6.84 | 4.56 | 45.83 | 30.56 | 6.87 | 1.5 |
| Example 47 (DOCDA-p-PDA + ODA) | 84 | 15.2 | 2.78 | 1.74 | 48.28 | 30.22 | 5.47 | 1.6 |
| Example 48 (DOCDA-TeMDA + ODA) | 206 | 27.1 | 5.9 | 3.6 | 57.22 | 34.921 | 4.59 | 1.59 |
| Example 49 (DOCDA-MBCA + ODA) | 204 | 24.8 | 5.9 | 3.7 | 55.14 | 34.58 | 4.20 | 1.43 |
| Example 50 (DOCDA-TeMPEDA + MDA) | 201 | 28.3 | 6 | 4.2 | 47.86 | 33.5 | 4.72 | 1.43 |
| Example 51 (DOCDA-MBCA + MDA) | 197 | 25.5 | 5.7 | 4.4 | 44.77 | 34.56 | 4.47 | 1.30 |

As shown in Table 3, the flat membrane comprising the polyimide-based macromolecular compound of the present invention was confirmed to have excellent gas selectivity, compared with that of the flat membrane comprising the conventional polyimide-based macromolecular compound.

Particularly, the flat membranes of the Examples of the invention comprising the polyimide-based macromolecular compounds of the present invention were confirmed to have the selectivity for $P_{CO2}/P_{CH4}$ of 46.3~67.0: the selectivity for $P_{CO2}/P_{N2}$ of 17.6~35.9; the selectivity for $P_{O2}/P_{N2}$ of 6.0~6.93; and the selectivity for $P_{N2}/PCH_4$ of 1.48~2.6, while the flat membrane of Example 18, DOC DA-MDA, and the flat membrane of Example 19, DOCDA-ODA, and the flat membranes of Comparative Examples comprising DOCDA-IPDA, DOCDA-BAPB, DOCDA-APPP, DOCDA-BAFBP, DOCDA-3BAPB, or DOCDA-BAPP had the selectivity for $P_{CO2}/P_{CH4}$ of 28.6~40.8; the selectivity for $P_{CO2}/P_{N2}$ of 12.0~27.9; the selectivity for $P_{O2}/P_{N2}$ of 4.8~5.69; and the selectivity for $P_{N2}/P_{CH4}$ of 1.2~2.4, indicating that the flat membranes of the Examples of the invention had at least 1.1 times and at most 1.6 times higher gas selectivity than those flat membranes of Comparative Examples.

The flat membrane of Example 19 particularly comprising DOCDA-ODA among the polyimide-based macromolecular compounds of the invention and the hollow-fibre membrane or Example 36 displayed excellent pure gas permeability and selectivity for all gases including $CH_4$, $N_2$, $O_2$, and $CO_2$, suggesting that DOCDA-ODA among the polyimide-based macromolecular compounds of the invention could be efficiently used as a gas separation macromolecule.

Further, compared with the flat membranes of Example 18~34, the hollow-fibre membranes of Examples 35~51 displayed significantly high pure gas permeability for all of $CH_4$, $N_2$, $O_2$, and $CO_2$, suggesting that the hollow-fibre membrane is more efficient in applying to the gas separation membrane comprising the polyimide-based macromolecular compound than the flat membrane.

The gas separation membrane prepared by using the polyimide-based macromolecular compound of the present invention showed excellent gas selectivity for $CO_2/CH_4$, $CO_2/N_2$, $O_2/N_2$, and $N_2/CH_4$, significantly high $CO_2$ permeability, but significantly low $CH_4$ permeability. So, gas selection of $CO_2/CH_4$ was the most peculiar. Therefore, it was confirmed that the gas separation asymmetrical hollow-fibre membrane comprising the polyimide-based macromolecular compound of the invention could be efficiently used not only for the separation of $O_2/N_2$ from the mixed gas but also particularly for the separation of $CH_4$ from the mixed gas including $CH_4$ and $CO_2$.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:
1. A method for separating one or more gas from mixed gas using an asymmetrical hollow-fibre membrane compris- ing a polyimide-based macromolecular compound represented by the below formula 1:

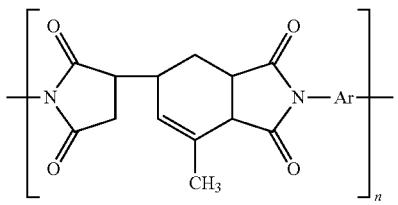
[Formula 1]

(In the formula 1,
Ar is selected from the group consisting of

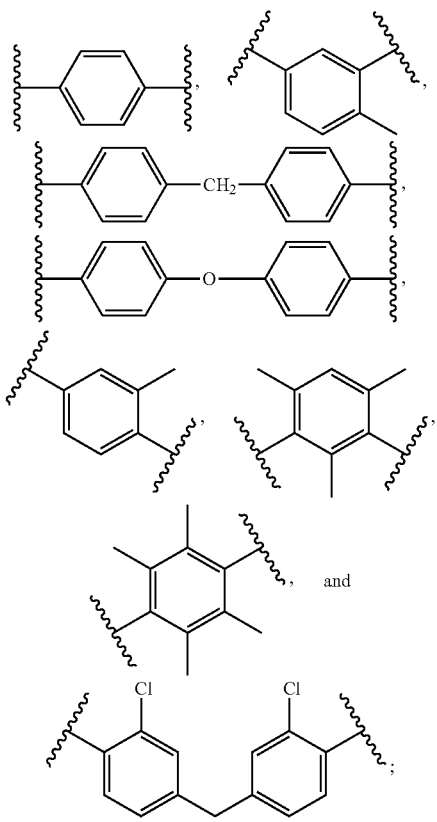

and
n is an integer of 50~150).

2. The method for separating the gas according to claim 1, wherein the mixed gas is a mixture of one or more gas selected from the group consisting of $CO_2$, $CH_4$, $N_2$ and $O_2$.

3. The method for separating the gas according to claim 1, wherein the separated gas is methane if the mixed gas comprises $CO_2/CH_4$ or $N_2/CH_4$.

4. The method for separating the gas according to claim 1, wherein the separated gas is methane if the mixed gas comprises $CO_2/N_2$ or $O_2/N_2$.

5. The method for separating gas according to claim 1, wherein the polyimide-based macromolecular compound represented by formula 1 above is prepared by the step of inducing polycondensation of the dianhydride compound represented by formula 2 and one or more monomer compounds selected from the group consisting of the diamine compounds represented by formula 3~formula 10 in the presence of metacresol at the temperature range of 150~203° C.:

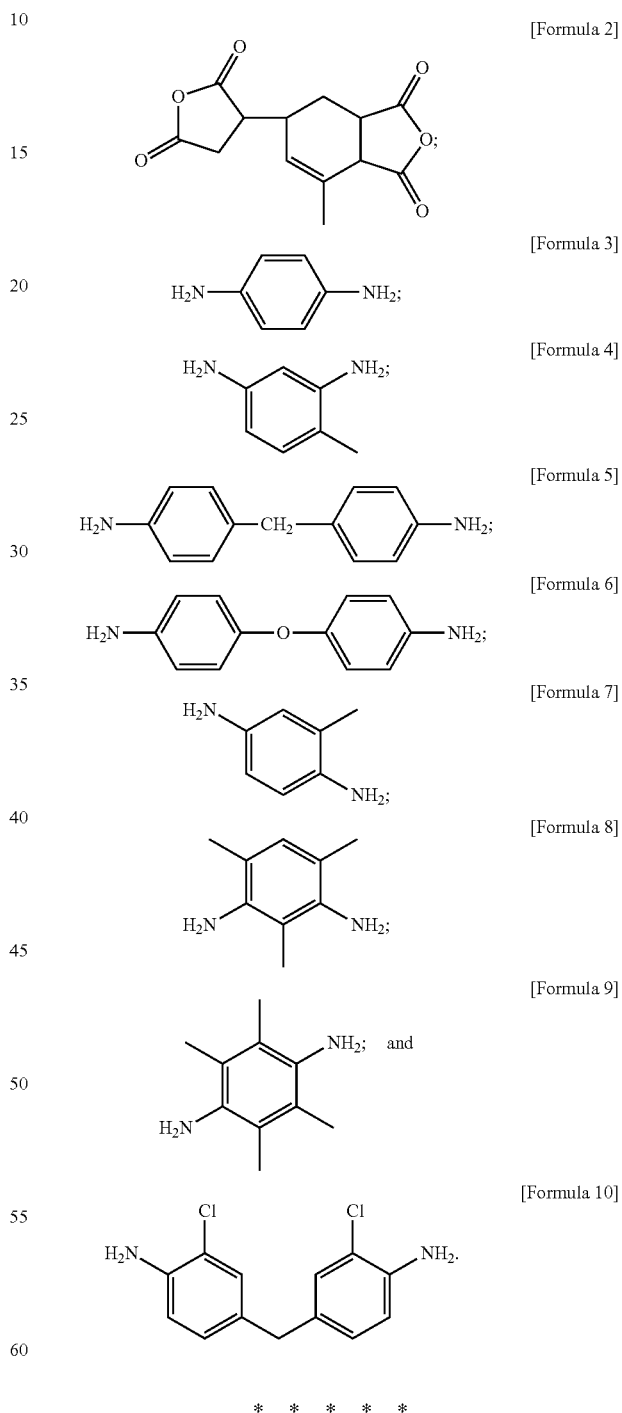

* * * * *